Aug. 16, 1960  J. E. COLLINS  2,949,131
FLUID CONTROL VALVE
Filed Aug. 15, 1956  4 Sheets-Sheet 1

INVENTOR.
JOHN E. COLLINS
BY
Bates, Pearce & McBean
ATTORNEYS

INVENTOR.
JOHN E. COLLINS
BY
Bates, Teare & McBean
ATTORNEYS

Aug. 16, 1960

J. E. COLLINS 2,949,131

FLUID CONTROL VALVE

Filed Aug. 15, 1956

INVENTOR.
JOHN E. COLLINS
BY
Bates, Peare & McBean
ATTORNEYS

Aug. 16, 1960

J. E. COLLINS 2,949,131

FLUID CONTROL VALVE

Filed Aug. 15, 1956

INVENTOR.
JOHN E. COLLINS
BY
Bates, Teare & McBean
ATTORNEYS

United States Patent Office 2,949,131
Patented Aug. 16, 1960

2,949,131

FLUID CONTROL VALVE

John E. Collins, Akron, Ohio, assignor, by mesne assignments, to International Basic Economy Corporation, New York, N.Y., a corporation of New York Filed Aug. 15, 1956, Ser. No. 604,247

14 Claims. (Cl. 137—623)

This invention relates to valves and more particularly to valves which are used for controlling the flow of fluid in gaseous or liquid systems.

It is an object of the present invention to provide a plunger control valve triggered by a single pilot control member requiring only momentary energization to effect plunger displacement in either direction.

Another object of the present invention is to provide a plunger control valve having means to prevent the plunger from inadvertently shifting its position.

Another object of the present invention is to provide a plunger control valve in which the plunger is self-locked at each end of its stroke by fluid pressure direct from the fluid supply line.

Another object of the invention is to provide a plunger valve that is efficient, durable and requires little maintenance and which affords complete flexibility of operation.

Other objects and advantages of the invention will be apparent from the following description taken in conjunction with the drawings in which.

Figure 1:
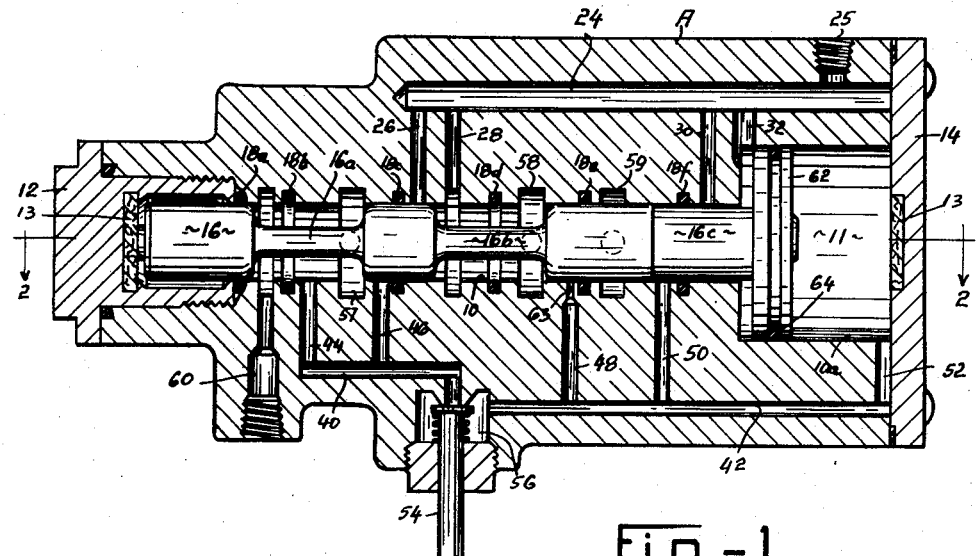
Fig. 1 is a vertical sectional view through a plunger valve embodying the present invention.

Referring to Fig. 1, there is shown a plunger type four-way valve having a body or housing A, which contains a longitudinal cylindrical bore 10, having an enlarged portion 10a at one end thereof forming the cylinder chamber 11. Each end of the bore is enclosed by the cap members 12 and 14 respectively which have the resilient shock pads 13 on the inner ends thereof.

Within the bore 10, there is a reciprocable plunger 16 necked-down at three locations 16a, 16b and 16c, the purpose of this reduction in diameter being to permit cross communication between certain body ports as will appear. The location 16c is necked-down a slight amount only to restrict the flow of fluid thereabout, the purpose for which will be hereinafter described. The plunger may float within a suitable packing means or assembly comprising, in this instance, a series of spacer rings 18a, 18b, 18c, 18d, 18e and 18f disposed in annular slots in the longitudinal wall of the bore as shown (Fig. 1). The packing ring assembly is fixed in position and the plunger 16 is freely movable therewithin.

Figure 2:
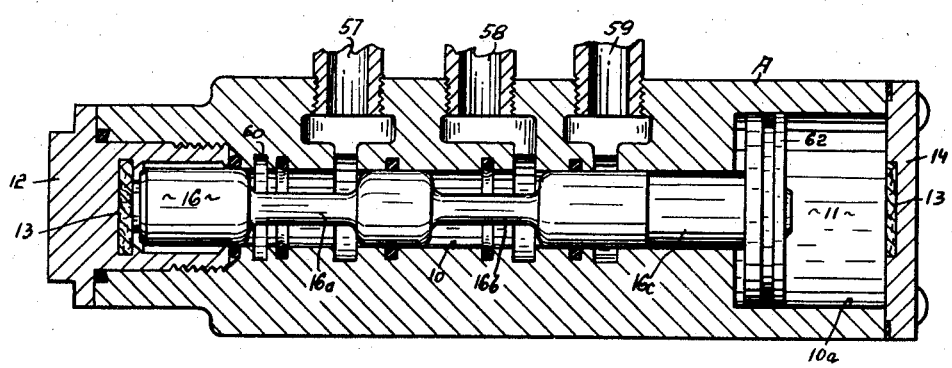
Fig. 2 is a horizontal sectional view taken along the line 2—2 of Fig. 1.
Figure 3:
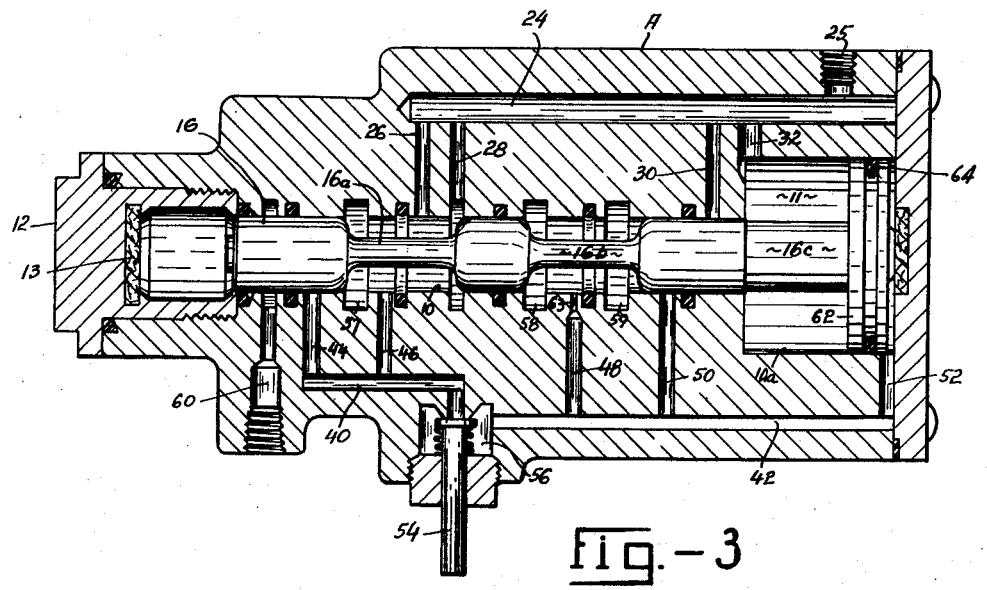
Fig. 3 is a view similar to Fig. 1, but showing the plunger in its right end position in the valve housing.

Disposed at the top of the housing A (Fig. 1) is an inlet fluid pressure chamber or passageway 24, which is in direct communication with the bore 10 through the passageways or ducts 26, 28 and 30 and with the left end of the chamber 11 through the passageway 32 as shown. The chamber 24 may be connected to a suitable outside source of pressurized fluid through the supply port 25. The housing A additionally includes the lines or passageways 44, 46, the drain passageway 48 and the passageway 50 respectively as shown. The passageway 42 is connected to the right end of the chamber 11 through the passageway 52. Interposed between the passageways 40 and 42 is the valve 54, which controls the flow of fluid therebetween, said passageways being directly connected to the valve control chamber 56. The valve 54 controls plunger reciprocation as will be hereinafter explained. Also included in the manifold system are the cylinder ports 57 (Figs. 1 and 2) and 58 and the exhaust port 59, all of which are in direct communication with the bore 10 as shown. Disposed near the left end of the bore is an exhaust port 60 (Fig. 1), which is in direct communication with the bore thereat. An additional path of exhaust is provided through the passageway 48 and the restricted orifice 63. More specifically, when the plunger 16 is in its right end position as shown in Fig. 3, any pressurized fluid in the right end of chamber 11 and in the passageways 52 and 42 may exhaust through the passageway 48, through the orifice 63 into the bore 10, and out the exhaust port 59 (Fig. 2).

The plunger 16 is provided with a piston or head 62, which is slidably disposed in the chamber 11 in sealing relationship with the longitudinal wall thereof. The head 62 may carry a seal ring 64 or the like, which has sliding, fluid-tight engagement with the longitudinal wall of the chamber 11 to prevent leakage of pressurized fluid past the head.

Operation of the plunger valve will now be described. As aforementioned, the inlet chamber 24 is connected to a suitable outside source of fluid pressure and thus always has pressure in it. Accordingly, passageways 26, 28, 30 and 32, always have pressure in them. When the plunger is disposed at its left end position as shown in Fig. 1, pressurized fluid may pass from the inlet pressure chamber 24, through the passageway 30, around the partially necked-down portion 16c of the plunger, through the passageways 50, 42 and 52 to the chamber 11, thus applying pressure to the right end of the head 62. Although inlet pressure is always maintained on the left end of the plunger head through the passageway 32, the plunger is retained in its left end position because of the difference in cross-sectional area of the two ends of the head which are exposed to fluid pressure.

To effect displacement of the plunger to its right end position in the bore, the normally closed valve 54 is momentarily actuated, thereby permitting the pressurized fluid in chamber 11 to be quickly vented to the atmosphere through the passageways 52 and 42, past the open valve 54, through passageways 40 and 44, past the necked-down portion 16a of the plunger and out the exhaust port 60, thus permitting the plunger to be moved quickly to its right end position (Fig. 3), by reason of the pressure which is always maintained on the left end of the plunger head as aforedescribed. When the plunger is in its right end position, the exhaust port 60 is blocked by the plunger 16. However, any pressurized fluid remaining in the right end of chamber 11 and in the passageways 52 and 54 may exhaust through the passageway 48, through the orifice 63, into the bore 10, and out the exhaust port 59. Thus by momentarily opening the valve 54 with the plunger at its left end position, a pressure drop occurs in the right end of chamber 11, thereby causing the plunger to quickly move to its right end position due to the constantly maintained pressure on the left end of the head 62. When the plunger is at its right end position (Fig. 3), it may be moved to its left end position by momentarily actuating the valve 54, which permits pressurized fluid to enter the right end of chamber 11 from the inlet pressure chamber 24, through passageway 26, around the necked-down portion 16a of the plunger, down the passageways 46 and 40, past the open valve 54, through the passageway 42, up the passageway 52 and into the chamber 11. Inlet pressure is now maintained on both sides of the head 62 and the plunger moves to the left (Fig. 1) by reason of the difference in cross sectional area of the two ends of the head as aforedescribed.

The passageway 48 (Fig. 3) is orificed down as at 63 to restrict the flow of fluid therethrough. Accordingly, when the valve 54 is momentarily actuated to move the plunger to the left as above described, the inlet pressurized fluid moving to the right through the passageway 42 cannot materially escape through the passageway 48 and out the exhaust port 59 (Figs. 2 and 3), thus effecting a pressure build-up in the right end of chamber 11 and moving the plunger to the left. For the same reason, upward flow of pressurized fluid through the passageway 50 (Fig. 1) is substantially restricted by the plunger portion 16c (when the plunger is at its left end position), which is only very slightly necked-down.

Figure 4:
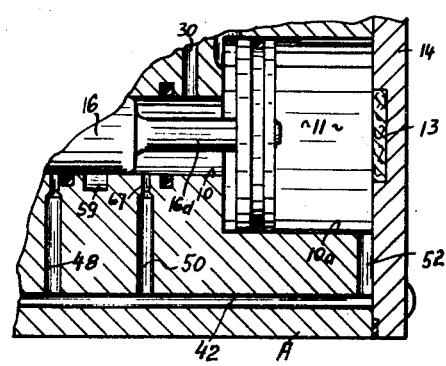
Fig. 4 is a partial vertical sectional view through the plunger valve shown in Fig. 1, but showing a modification of the plunger and one of the fluid passageways therein.

A modified means for restricting the upward flow of fluid through the passageway 50 is shown in Fig. 4, wherein the passageway has a restricted neck 67. In this latter case, the plunger has a fully necked-down portion 16d at this location to permit free fluid flow in the bore 10 between the passageways 30 and 50, the only restriction to free flow being at the neck 67.

As aforementioned, the flow of pressurized fluid through the valve is controlled by the necked-down portions of the plunger. When the plunger is in its left end position in the bore 10, pressurized fluid in the cylinder passageway 57 (Fig. 2) may exhaust past the necked-down portion 16a of the plunger and out the exhaust passageway 60 (Fig. 1). At the same time, the cylinder passageway 58 will receive pressurized fluid from the inlet chamber 24 through the passageway 28, past the necked-down portion 16b of the plunger and into the cylinder passageway 58. When the plunger is at its right end position in the bore (Fig. 3), pressurized fluid in the cylinder passageway 58 may exhaust past the necked-down portion 16b of the plunger and out the exhaust passageway 59. At the same time, the cylinder passageway 57 will receive pressurized fluid from the inlet chamber 24, through the passageway 26, past the necked-down portion 16a of the plunger and into the cylinder passageway 57.

To effectively maintain the plunger in each of its positions, provision is made for self-locking the plunger at each end of its stroke by applying fluid pressure from the inlet pressure chamber substantially direct to the plunger head 62. More specifically, when the plunger is at its left end position in the bore (Fig. 1) it is locked positively in such position by pressurized fluid from the inlet chamber 24, which flows through the inlet passageway 30 (Fig. 1) past the slightly necked-down portion 16c of the plunger, through the passageways 50 and 42, up the passageway 52 and into the right end of the chamber 11, thus directly applying the full amount of the inlet pressure on the right end of the plunger head to securely position the plunger in its left end position. When the plunger is in its right end position in the bore (Fig. 3), it is self-locked thereat by pressure directly from the inlet pressure chamber 24, which enters the inlet passageway 32 and flows directly into the left end of chamber 11. Thus, the inlet passageways leading to each side of the plunger head 62 (namely, the inlet passageways 32 and the inlet passageway comprised of the passageways 30, 50, 42 and 52), are located on one side of the control valve 54, with the result that the plunger may be self-locked in either of its positions independent of the operation of the control valve 54.

When the plunger is in its right end position in the bore (Fig. 3), provision is made for preventing a shift in its position by means of an automatic fluid supply to make up for any loss of air into the right end of chamber 11, which may be caused for example, by a defect in the seal ring 64 on the plunger head 62. Any leaks from the left end of the chamber 11 to the right end thereof may be vented to the atmosphere through passageways 52, 42 and 48, past the necked-down portion 16b of the plunger and into the exhaust passageway 59, thus preventing any build-up of pressure in the right end of the chamber 11.

Figure 5:
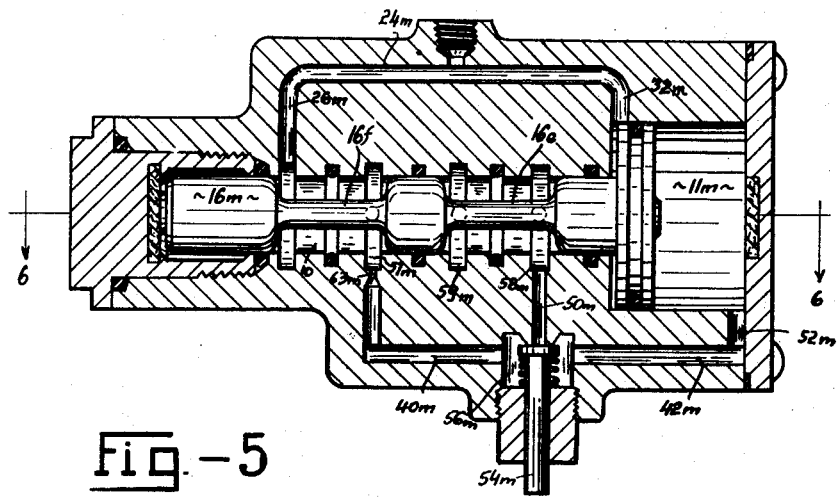
Fig. 5 is a vertical sectional view of a modified form of the valve shown in Fig. 1.
Figure 6:
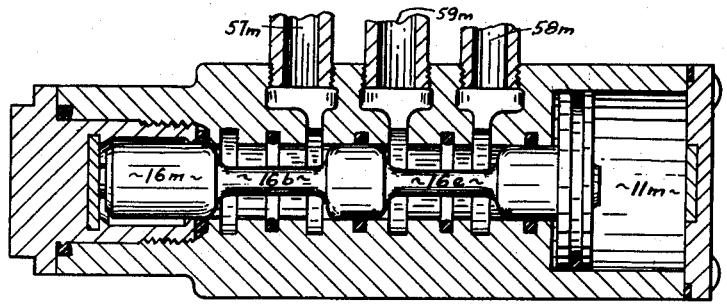
Fig. 6 is a horizontal sectional view taken along the line 6—6 of Fig. 5.
Figure 7:
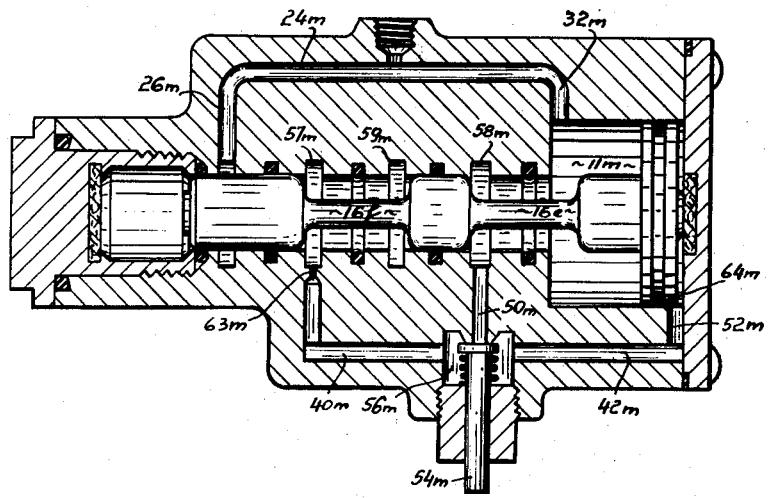
Fig. 7 is a view similar to Fig. 5, but showing the plunger in its right end position in the valve.

Figs. 5, 6 and 7 illustrate a modification of the mechanism shown in Fig. 1. In the modification, only one exhaust is used, with the result that the cylinder passageways 57m and 58m have a common exhaust 59m, thus substantially simplifying the arrangement of the passageways required. From the position shown in Fig. 5, the plunger may be moved to its right end position in the bore by momentarily opening the normally closed valve 54m, whereby the pressure in the chamber 11m is vented to the atmosphere through the passageways or lines 52m and 42m, past the open valve 54m, up the passageway 50m, past the necked down portion 16e of the plunger and out the exhaust port 59m (Figs. 5 and 6). The plunger may now move to its right end position as shown in Fig. 7 by reason of pressure from the inlet chamber 24m entering the chamber 11m through the passageway 32m and acting on the left end of the plunger head. From this position, the plunger may be moved to its left end position by momentarily opening the normally closed valve 54m, which permits pressurized fluid to flow from the inlet chamber 24m, down the passageway 32m and into the chamber 11m, past the necked-down portion 16e of the plunger, down the passageway 50m, past the open valve 54m, through the passageway 42m, up the passageway 52m and into the right end of chamber 11m, thus displacing the plunger to its left end position. In the latter case, the fluid cannot flow freely from passageway 50m, through passageway 40m and out the exhaust passageway 59m by reason of the restricted neck portion 63m in the passageway 40m.

The plunger is self-locked in its left end position by fluid pressure from the fluid supply passageway 24m which flows through the passageway 26m (Fig. 5), past the necked-down portion 16f of the plunger, through the passageway 40m, through the valve chamber 56m, through the passageway 42m, up the passageway 52m and into the right end of the chamber 11m. The plunger is self-locked in its right end position (Fig. 7) by fluid pressure from the fluid supply passageway 24m, which flows through the passageway 32m and into the left end of chamber 11m. Thus, the modification shown in Figs. 5, 6 and 7 includes an arrangement whereby one side of the control valve 54m is connected to a supply passageway (comprising the passageways 26m, 40m, 42m, and 52m) and the other side of the valve is connected to an exhaust passageway (passageway 50m).

When the plunger is in its right end position (Fig. 7), any leaks from the left end of chamber 11m to the right end thereof, which may be caused for example by a defective seal ring 64m on the plunger head, may be vented to the atmosphere through the passageways 52m, 42m, through the valve chamber 56m, through the passageway 40m, past the necked-down portion 16f of the plunger and out of the exhaust port 59, thus avoiding any build-up of pressure in the right end of chamber 11m and thereby preventing the plunger from shifting its position.

Figure 8:
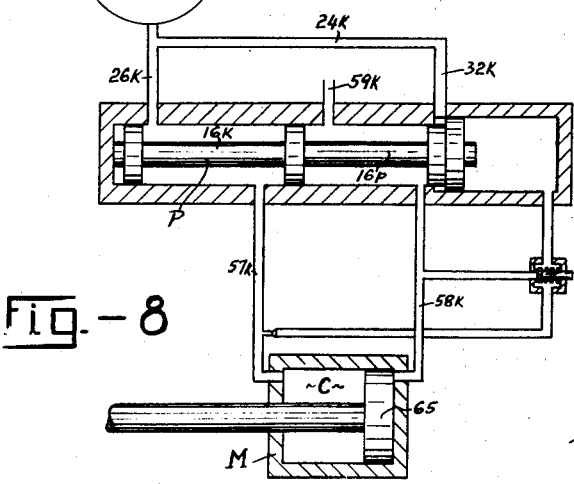
Fig. 8 is a diagrammatic view showing the manner in which the valve in Fig. 5 may operate a piston-cylinder mechanism.

The plunger valve shown in Figs. 1 through 4, and the modified valve shown in Figs. 5 through 7, are each adapted to control a piston-cylinder mechanism or the like in similar manner. Fig. 8 diagrammatically illustrates the manner in which the modified form operates the piston-cylinder mechanism M. The passageways 57k, 58k, and 59k in Fig. 8 correspond to passageways 57m, 58m, and 59m respectively in Fig. 6. With the plunger P in its left end position as shown, pressurized fluid enters the passageway 26k from the source of supply S, flows past the plunger necked-down portion 16k, down the passageway 57k and into the left end of the chamber C thereby displacing the piston 65 to the right. At the same time, the pressurized fluid in the right end of chamber C exhausts through the passageway 58k, around the necked-down portion 16p of the plunger and out the exhaust passageway 59k. When the plunger P is moved to its right end position, pressurized fluid may flow from the source of supply S, through the passageway 24k, down the passageway 32k, around the plunger necked-down portion 16p, down the passageway 58k and into the right end of chamber C, thereby displacing the piston 65 to the left. At the same time, the pressurized fluid in the left end of the chamber C may exhaust through passageway 57k, around the necked-down portion 16k of the plunger and out the exhaust port 59k.

In place of the valve 54 (Fig. 1) or the valve 54m (Fig. 5), a solenoid operated pilot control member or valve B (Fig. 9) adapted for momentary actuation may be used to control plunger reciprocation. The valve B comprises a body or housing 66 in which is fixed a solenoid coil 68, which is in excessible communication with the junction box portion 70 of the body. Within the solenoid coil an armature 72 is vertically reciprocable, responsive to momentary energization of the solenoid 68 by means of any suitable timer device. A plate 74 is retained on the bottom of the housing 66 by screws 76. Disposed in the side of the valve housing is a manual override valve E which may be used to control movement of the plunger 16m independent of the energization of the solenoid coil 68. The override valve includes a body 80 and a control plunger or valve 82 operated by a button 84. The plunger 82 forms into a stem 86, which carries a valve head 88. The valve is shown in its open or unseated position (this being the normal position of the valve), whereby fluid flow is permitted between passages 90 and 92. Passage 92 communicates with the passage 40m. To close or seat the valve E, the plunger 82 is moved to the right until the head 88 engages the valve seat 102. Once the valve is in its seated position, the stem 86 may be rotated and a cut-away portion of the flange 96 can pass the head 98 of the stud 100, which is fixed in the body 80 so that the override valve cannot be drawn to the left, thus locking the valve in its seated position.

Assuming the override valve E to be open and the plunger 16m to be in its left end position in the bore and the solenoid pilot control member de-energized as shown (Fig. 9), fluid pressure may flow from the inlet chamber 24m, through the passageway 26m, around the necked-down portion 16f of the plunger, down the passageway 40m, through the annular passage 94, through passage 92, past the open override valve head 88, through passages 90, 104 and 106, past the open valve head 108 (this valve being open because armature 72 is in its top position), through the slots 110 in the armature side (Figs. 9 and 10), through the passage 112 (Fig. 9) in the housing 66, through the (annular) passageway 113, through the passageways 42m and 52m and into the chamber 11m, thus maintaining the plunger 16m in its left end position, as shown, by pressure from the supply chamber 24m.

When the armature 72 is momentarily lowered by the energization of coil 68, the solenoid valve head 108 at the lower end of the armature is closed, thus terminating fluid flow thereby. At the same time, valve head 120 at the upper end of the armature is open and the pressurized fluid in chamber 11m can exhaust through passages 52m, 42m, 113 and 112, past valve head 120 (which is now open), through passages 122 and 50m, past the necked-down portion 16e of the plunger and out the exhaust port 59m. The plunger 16m now moves to the right by reason of the pressure from inlet chamber 24m flowing through passageway 32m and acting on the left end of the plunger head thereby displacing the plunger to the right. When the plunger is in its right end position, the passageway 26m is blocked off, thus preventing fluid flow through the passageway 40m and through the solenoid valve E and the passageways 42m and 52m to the right end of chamber 11m as aforedescribed and thus preventing the plunger from shifting its position.

When the plunger is in its right end position, it may be returned to its left end position by momentarily energizing the solenoid pilot control member B which permits fluid to flow from the passageway 32m, through the left end of chamber 11m and around the necked-down portion 16e of the plunger, down the passageways 50m and 122, past the momentarily opened passageways 112, 113, 42m, 52m and into the right end of chamber 11m thus forcing the plunger to the left. Once the plunger is in its left end position, it is retained there by pressurized fluid flowing directly from the supply chamber 24m, through the passageways 26m, 40m and through the solenoid valve B and the passageways 42m, 52m to the right end of chamber 11m as aforedescribed.

Figure 9:
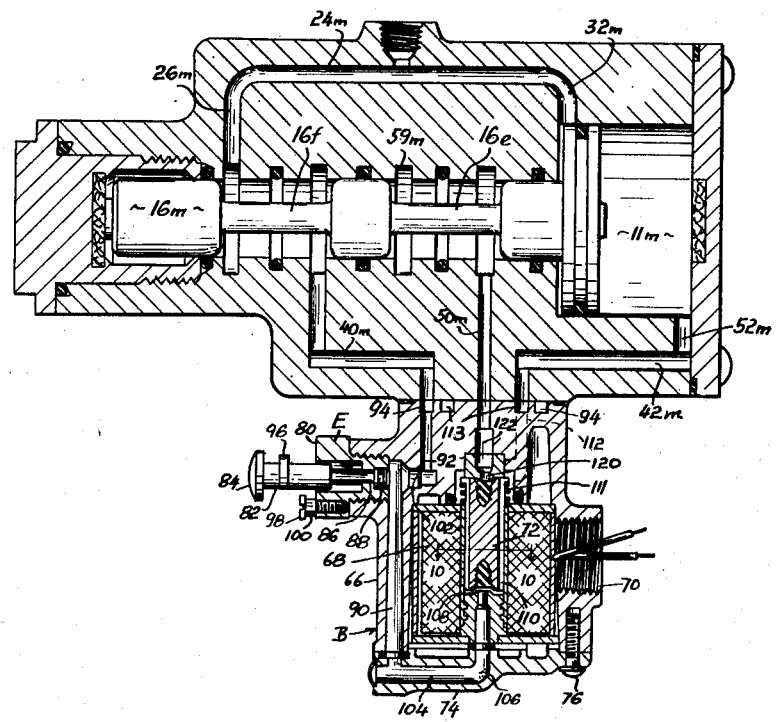
Fig. 9 is a view corresponding to Fig. 5, but showing the plunger valve with a solenoid operated pilot control member having a manually operated override valve for controlling plunger reciprocation.
Figure 10:
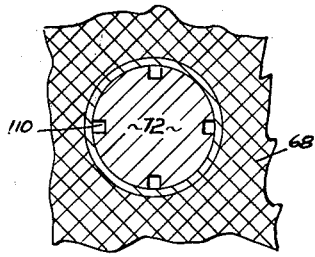
Fig. 10 is an enlarged horizontal sectional view taken along the line 10—10 of Fig. 9.

If the electric current is cut off unexpectedly, or if it's desired to manually control movement of the plunger 16m, for instance in setting up and checking an assembly, the plunger 16m may be controlled by manual operation of the override valve E without energization of the control solenoid 68. It is assumed for the purpose of illustration that fluid under pressure is supplied to the plunger valve as heretofore described, that the override valve E is in its normal or open position (as shown Fig. 9), that the armature 72 is in its upper or de-energized position (the armature being held in such position by the spring 111), and that the plunger 16m will be in its left end position as shown in Fig. 9. When it is desired to have the plunger 16m move to its right hand position, the override valve E is manually closed. This stops the flow of pressurized fluid to the right end of chamber 11m and permits the fluid in such chamber to be relieved by flowing through the passages 52m, 42m, 113 and 112, through the armature slots 110, past the open valve head 108, through passages 106, 104, 90, and escaping to the exterior of the structure by passing along the stem 86 and the plunger 82 to the exterior of the body 80, such stem and plunger having a loose fit with such body. The relief of pressure in the right end of chamber 11m results in movement of the plunger 16m to its right end position as heretofore described in connection with the normal operation. When the solenoid 68 is used under normal operation the valve E is open. When such valve is open, leakage of the pressurized fluid along the stem 86 and the plunger 82 is prevented by engagement of the valve head 88 with the seat provided in the body 80 between its reduced diameter portion and the passageway 90.

The terms and expressions which have been employed are used as terms of description and not of limitation and there is no intention, in the use of such terms and expressions, of excluding any equivalents of the features shown and described or portions thereof, but it is recognized that various modifications are possible within the scope of the invention claimed.

I claim:

1. A plunger valve for controlling the flow of pressurized fluid comprising a housing having a bore therein closed at its ends, said bore having an enlarged chamber at one end thereof, a plunger disposed in said bore for reciprocation therein, said plunger having a head at one end disposed in said chamber and adapted for sliding, leak-proof engagement with the longitudinal wall of the chamber, said head having opposing ends of different cross-sectional areas, said housing having a plurality of fluid passageways in communication with said bore including a fluid supply chamber adapted for connection to a source of pressurized fluid exteriorly of the housing, a fluid supply passageway leading from said supply chamber to that end of said enlarged chamber adjacent the smaller end of said head for supplying pressurized fluid thereto, a fluid supply duct leading from said supply chamber to a predetermined location in one side of the bore, a fluid supply line leading from said location at another side of the bore to that end of the enlarged chamber adjacent the larger end of said head, and an exhaust passageway leading from a point in the bore adjacent said location to the exterior of the housing, said plunger having spaced, necked-down locations to permit fluid flow between said passageways in a predetermined manner when said plunger is disposed in predetermined positions in the bore including a necked-down portion allowing fluid to flow from said fluid supply duct through the bore, and through said fluid supply line and to that end of said enlarged chamber opposite the larger end of said head when said plunger is disposed at one position in the bore, and allowing fluid to flow from said last-named end of said enlarged chamber through said supply line, through the bore to the exhaust passageway when the plunger is disposed at another position in the bore, said fluid supply line having a valve for controlling the flow of fluid in the line.

2. A plunger valve constructed in accordance with claim 1 wherein said spaced necked-down locations include a second necked-down portion on the plunger and said plurality of fluid passageways includes a second exhaust passageway leading from a second location in one side of the bore to the exterior of the housing and a drain passageway leading from said fluid supply line to a point adjacent said location whereby, fluid may flow from that end of said enlarged chamber adjacent the larger end of said head, through said supply line, through said drain passageway, through the bore past said second necked-down portion of the plunger, and out said second exhaust passageway when said plunger is disposed at said one position in the bore.

3. A plunger valve constructed in accordance with claim 2 wherein said second drain passageway has a restricted portion therein to partially restrict the flow of fluid therethrough.

4. A plunger valve constructed in accordance with claim 1 wherein said plurality of fluid passageways includes a second fluid supply passageway leading from said supply chamber to a third location in one side of the bore and a second fluid supply line leading from said third location at another side of the bore to said first fluid supply line, and wherein said necked-down locations include a partially necked-down portion disposed at said other position in the bore thereby substantially retricting the flow of fluid between said second fluid supply passageway and said second fluid supply line.

5. A plunger valve constructed in accordance with claim 1 wherein said plurality of fluid passageways includes a second fluid supply passageway leading from said fluid supply chamber to a third location at another side of the bore to said first fluid supply line, and wherein said necked-down locations include a third necked-down portion disposed at said third location in the bore to permit the flow of fluid between said second fluid supply passageway and said second fluid supply line when said plunger is disposed at said other position in the bore, said second fluid supply line having a restricted portion to restrict the flow of fluid therein.

6. A plunger valve for controlling the flow of pressurized fluid comprising, a housing having a bore having an enlarged chamber at one end thereof, a plunger disposed in said bore for reciprocation therein, said plunger having a head at one end disposed in said chamber and adapted for sliding, leak-proof engagement with the longitudinal wall of the chamber, said head having ends of different cross-sectional area, a control valve disposed in said housing and having a control chamber therein, said housing having a plurality of fluid passageways in communication with said bore including a fluid supply chamber in communication with that end of said enlarged chamber adjacent the smaller end of said head and in communication with the bore at a predetermined location therein, said fluid supply chamber being adapted for connection to a source of pressurized fluid exteriorly of the housing, a first passageway leading from the bore to that end of the enlarged chamber adjacent the larger end of said head, said control chamber being in communication with said first passageway, a second passageway leading from another location in the bore to said control chamber, a valve normally closing said second passageway from communication with said control chamber, and an exhaust passageway leading from the bore to the exterior of the housing, said plunger having spaced, necked-down locations to permit fluid flow between said passageways, said bore and said chambers in a predetermined manner when the plunger is disposed in predetermined positions in the bore including, a necked-down portion allowing fluid to flow from said fluid supply chamber, through said first passageway and to that end of said enlarged chamber adjacent the larger end of said head when said valve is momentarily actuated and said plunger is disposed at one position in the bore thereby displacing said plunger to another position in the bore, and including a second necked-down portion allowing fluid to flow from said last-named end of said enlarged chamber, through said supply passageway, and out said exhaust passageway when said valve is momentarily actuated and said plunger is disposed at said other position in the bore, thereby displacing said plunger to said one position in the bore.

7. A valve including a housing having a bore therein and closed at its ends, one end of the bore terminating in an enlarged chamber having a longitudinal wall, said housing having a plurality of passageways extending between said bore and the exterior of said housing, a plunger disposed in the bore for reciprocation therein, said plunger having spaced necked-down portions to permit pressurized fluid to flow between predetermined passageways when said plunger is reciprocated to predetermined positions in the bore, said plunger having a fluid pressure retaining head at one end thereof disposed in said chamber in fluid-tight contact with said longitudinal wall, the head having opposing pressure responsive actuating surfaces on opposite sides thereof, the side of the head directed away from the plunger being of larger area than the side of the head facing the plunger, means for maintaining pressurized fluid on the side of said head of smaller area to bias said plunger towards one end of the bore, and a control valve disposed on said housing, said housing and said control valve including a passageway through which pressurized fluid may flow from a source through the bore past one of said necked-down portions and to said larger side of said head when said plunger is disposed at one position in the bore, said plunger being formed to block said last-named passageway when the plunger is disposed at another position in the bore, said control valve having a solenoid operated means for controlling the flow of pressurized fluid through said passageway in either direction.

8. A plunger valve for controlling the flow of pressurized fluid comprising, a housing having a bore therein closed at its ends, said bore having an enlarged chamber at one end thereof, a plunger disposed in said bore for reciprocation therein, said plunger having a head at one end disposed in said chamber and adapted for sliding, leak-proof engagement with the longitudinal wall of the chamber, said head having ends of different cross-sectional area, a control valve disposed in said housing, said housing containing a fluid manifold having a plurality of fluid passageways in communication with that end of said enlarged chamber adjacent the smaller end of said head and in communication with the bore at one side thereof at a predetermined location therein, said fluid supply chamber being adapted for connection to a source of pressurized fluid exteriorly of the housing, a fluid supply passageway leading from a point adjacent said location from another side of the bore, through said control valve to that end of the enlarged chamber adjacent the larger end of said head, a second passageway leading from a point in the bore adjacent said enlarged chamber to said control valve, an exhaust passageway leading from a point in the bore intermediate said enlarged chamber and said location to the exterior of the housing, said plunger having spaced, necked-down locations to permit fluid flow between said passageways, said bore and said chambers in a predetermined manner when said plunger is disposed in predetermined positions in the bore including, a necked-down portion allowing fluid to flow from that end of said enlarged chamber adjacent the larger end of said head, through said supply passageway, through the control valve, through said second passageway and out said exhaust passageway when the control valve is momentarily actuated and said plunger is disposed in one position in the bore, thereby displacing said plunger to another position in the bore.

9. A plunger valve constructed in accordance with claim 8 wherein said second passageway has a restricted portion between the bore and the control valve to restrict the flow of fluid therethrough.

10. In a plunger valve wherein a plunger is adapted for continuous biasing toward a first position in the main bore of a valve housing and for reciprocation to a second position in said bore against the opposition of said biasing force only in response to fluid pressure communicated to a pressure-responsive actuating surface of the plunger, the improvement comprising the combination of a first passageway in communication with said actuating surface, a second passageway adapted for selective communication with said actuating surface, a control valve normally closing said second passageway and operable for momentarily opening said second passageway to provide said selective communication with said actuating surface, said first and second passageways being alternately interchangeably communicated with regions of pressure and regions of exhaust in said bore by reciprocation of the plunger to said positions, viz.: (a) in the first position of the plunger, the first passageway communicating with an exhaust region of said bore so that said plunger actuating surface is connected to exhaust while the second passageway is communicated with a pressure region of the bore against which pressure said control valve is closed; and (b) in the second position of the plunger, the first passageway communicating with a pressure region of said bore so that said plunger actuating surface is connected to said pressure while the second passageway is communicated with an exhaust region of the bore against which said control valve is closed; the plunger being reciprocated to interchange the bore communication with said passageways by the momentary opening of said control valve.

11. The improved plunger valve of claim 10, which further includes means for obstructing flow of fluid thru said first passageway toward said bore in the interval in which said control valve is momentarily open.

12. A plunger valve according to claim 10 wherein said control valve is a three-way electromagnetically operated valve having one operating position in which it closes said second passageway and opens said first passageway to communication with said actuating surface, and having its second operating position in which said second passageway is opened while said first passageway is closed.

13. A plunger valve according to claim 10 wherein said plunger has attached thereto a differential area head slidable in a chamber adjoining the bore, means for continuously communicating the smaller surface of said head to fluid pressure to bias the plunger toward said first position, and wherein said "actuating surface" of claim 10 is the larger opposing side of said head.

14. In a plunger valve having a housing with main fluid flow ports therein including a pressure supply port and an exhaust port opening into a main bore of the housing, and a plunger in said main bore having opposing differential area pressure-responsive actuating surfaces adapted for effecting plunger reciprocation between a first position and a second position in said bore, the plunger having portions for connecting certain of the ports in each of said plunger positions, the improvement comprising: means for communicating fluid pressure when the plunger is in either of said positions to the smaller actuating surface of the plunger to bias the plunger toward said first position; a first passageway and a second passageway each communicating with the larger actuating surface of the plunger; a control valve normally closing said second passageway from communication with said larger actuating surface; said first and said second passageways being alternately interchangeably communicated with regions of pressure and regions of exhaust in said bore by reciprocation of the plunger to said positions, viz. (a) in the first position of the plunger, the first passageway communicating with an exhaust region of said bore so that said larger plunger actuating surface is connected to exhaust while the second passageway is communicated with a pressure region of the bore against which pressure said valve is closed; and (b) in the second position of the plunger, the first passageway communicating with a pressure region of said bore so that said larger plunger actuating surface is communicated to pressure while the second passageway is communicated with an exhaust region of the bore against which said control valve is closed; the plunger being reciprocated to alternately interchange the bore communication with said passageways by the momentary opening of said control valve.

References Cited in the file of this patent

UNITED STATES PATENTS

| | | |
|---|---|---|
| 410,184 | Ongley | Sept. 3, 1889 |
| 446,836 | Matthews | Feb. 17, 1891 |
| 471,882 | Nanney | Mar. 29, 1892 |
| 786,653 | Larsson | Apr. 4, 1905 |
| 1,919,402 | Thompson | July 25, 1933 |
| 2,775,982 | Canfield | Jan. 1, 1957 |